(12) United States Patent
Ishii et al.

(10) Patent No.: US 9,597,854 B2
(45) Date of Patent: Mar. 21, 2017

(54) RESIN LAMINATED PLATE

(71) Applicant: KYORAKU CO., LTD., Kyoto (JP)

(72) Inventors: Kenji Ishii, Aichi (JP); Tadatoshi Tanji, Gifu (JP)

(73) Assignee: KYORAKU CO., LTD., Kyoto (JP)

( * ) Notice: Subject to any disclaimer, the term of this patent is extended or adjusted under 35 U.S.C. 154(b) by 0 days.

(21) Appl. No.: 14/915,345

(22) PCT Filed: Aug. 26, 2014

(86) PCT No.: PCT/JP2014/072236
§ 371 (c)(1),
(2) Date: Feb. 29, 2016

(87) PCT Pub. No.: WO2015/029971
PCT Pub. Date: Mar. 5, 2015

(65) Prior Publication Data
US 2016/0207276 A1   Jul. 21, 2016

(30) Foreign Application Priority Data
Sep. 2, 2013   (JP) .................. 2013-181279

(51) Int. Cl.
B32B 3/30         (2006.01)
B32B 27/08        (2006.01)

(52) U.S. Cl.
CPC ............... B32B 3/30 (2013.01); B32B 27/08 (2013.01); *B32B 2307/718* (2013.01);
(Continued)

(58) Field of Classification Search
CPC .... B32B 3/12; B32B 3/28; B32B 3/30; Y10T 428/24612; Y10T 428/24562; Y10T 428/24661
See application file for complete search history.

(56) References Cited

U.S. PATENT DOCUMENTS

2011/0303355 A1   12/2011   Sumi et al.
2014/0127471 A1    5/2014   Matsubara et al.

FOREIGN PATENT DOCUMENTS

EP   2520410 A1   11/2012
EP   2727718 A1    5/2014
(Continued)

OTHER PUBLICATIONS

Translation of JP 2000-085039.*
(Continued)

*Primary Examiner* — Catherine A Simone
(74) *Attorney, Agent, or Firm* — Maier & Maier, PLLC

(57) ABSTRACT

Provided is a resin laminates in which the depth of concave ribs provided to a back side sheet can be made uniform, even when a convex region and flat regions are present on an front side sheet of the resin laminate. The resin laminate is provided with the front side sheet and the back side sheet, which overlap with a hollow interposed therebetween. The back side sheet is recessed into the hollow, and a large number of concave ribs are provided. The bottoms of the concave ribs are fused to the front side sheet. The front side sheet is provided with front side flat region configured from a flat surface and a front side convex region protruding away from the hollow. The back side sheet is provided with back side flat region configured from a flat surface and a back side concave region recessed into the hollow.

6 Claims, 6 Drawing Sheets

A-A CROSS-SECTIONAL VIEW

(52) U.S. Cl.
CPC ....... *B32B 2419/00* (2013.01); *B32B 2553/00* (2013.01); *B32B 2605/00* (2013.01)

(56) References Cited

FOREIGN PATENT DOCUMENTS

| | | |
|---|---|---|
| JP | H04-83741 U | 7/1992 |
| JP | 2000085039 A | 3/2000 |
| JP | 2007152876 A | 6/2007 |
| JP | 2013010273 A | 1/2013 |

OTHER PUBLICATIONS

International Search Report dated Nov. 18, 2014 from corresponding International Patent Application No. PCT/JP2014/072236; 4 pgs.

Extended European Search Report dated Aug. 2, 2016, including the Supplementary European Search Report and the European Search Opinion, in connection with corresponding EP Application No. 14840822.2 (7 pgs.).

\* cited by examiner

Fig. 1 (a)
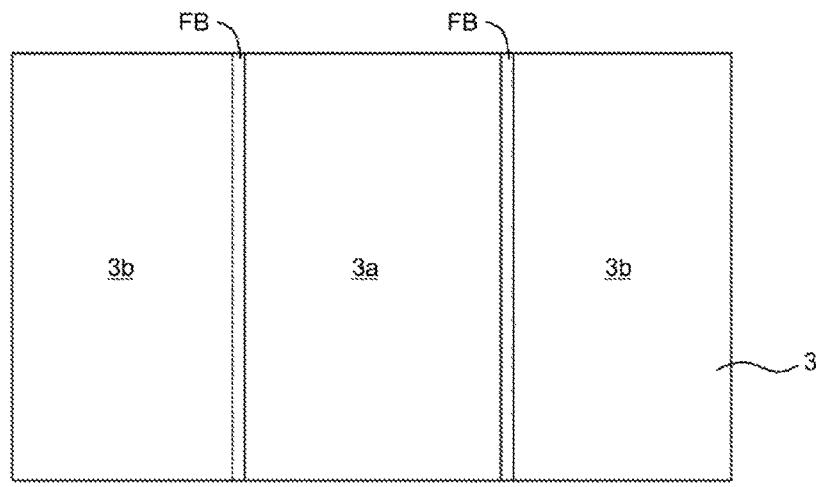
FIG. 1 (b)
A-A CROSS-
SECTIONAL VIEW
FIG. 1 (c)
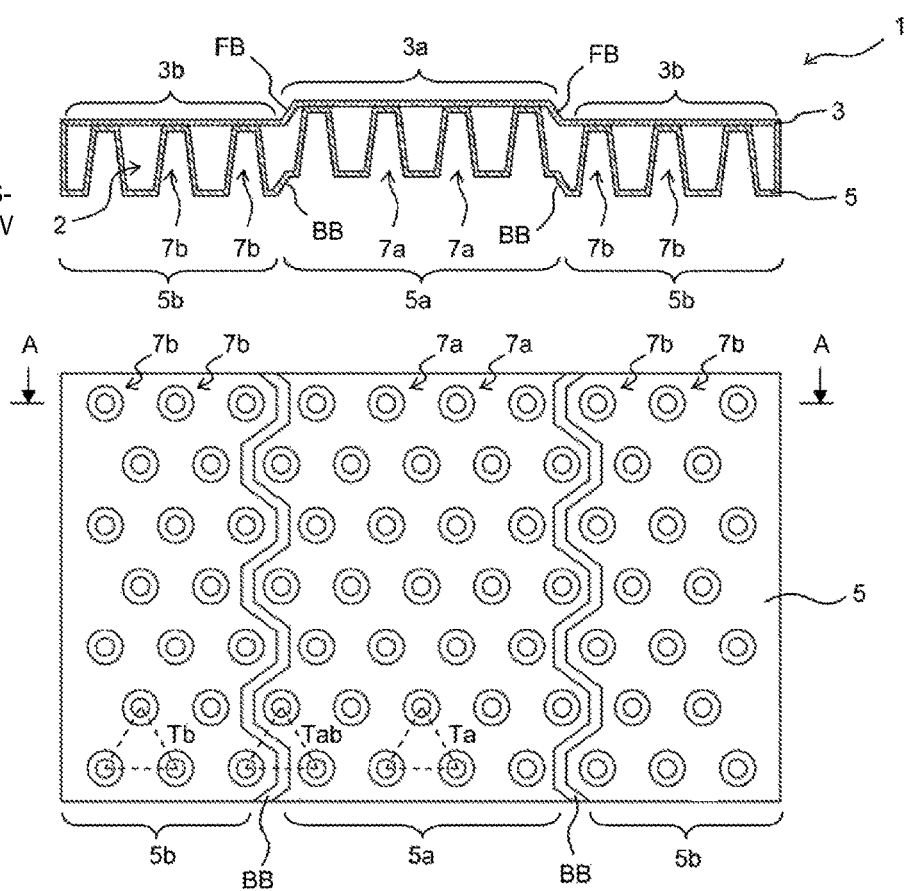

HORIZONTAL
DIRECTION

RESIN LAMINATED PLATE

TECHNICAL FIELD

The present invention relates to a resin laminate.

BACKGROUND ART

So-called resin laminates are conventionally employed for interior materials of automobiles, building materials, and materials for logistics and packaging. Such resin laminate has a front surface material made of a resin and a back surface material made of a resin. The back surface material is provided with concave ribs having tip ends to be abutted on the internal surface of the front surface material. For a method of manufacturing such resin laminate, various methods have been employed conventionally.

For example, PTL 1 discloses a method as follows.

That is, using a split mold in which a cavity in one piece of the split mold is provided with a plurality of projections projecting towards the other piece of the split mold, two sheet materials made of a thermoplastic resin in a molten state is positioned between the pair of split mold pieces. Then, after an enclosed space is formed between one of the sheet materials and the cavity in the one piece of the split mold, the air in the enclosed space is sucked from the side of the one piece of the split mold. By the suction action, a plurality of concave ribs are formed in the sheet material at the plurality of projections. By closing the pair of split mold pieces, the bottom of the concave ribs is welded to the other sheet material to obtain a resin laminate having a hollow structure reinforced by the plurality of ribs.

Use of such manufacturing technique enables maximum thinning of the respective thicknesses of the two sheet materials, thereby enabling reduction in weight and thickness while securing the manufacturing efficiency and the product quality.

CITATION LIST

Patent Literature

PLT 1: Japanese Unexamined Patent Application Publication No. 2013-10273

SUMMARY OF INVENTION

Technical Problem

In PTL 1, a resin laminate having a flat surface of a front side sheet is assumed, where a back side sheet is provided with a step to form a thick plate area and a thin plate area in the resin laminate. The concave ribs having the back side sheet recessed towards the front side sheet have the depth in the thick plate area deeper than the depth in the thin plate area.

As illustrated in FIG. 6, a front side sheet 3 of a resin laminate 1 is sometimes provided with a convex region 3a and flat regions 3b. In such a case, concave ribs 7a with a back side sheet 5 recessed towards the front side sheet 3 in a manner same as that in PTL 1 have the depth in the convex region 3a deeper than the depth in the flat regions 3b. The concave ribs 7a formed in the convex region 3a, therefore, have a thickness thinner than the thickness of concave ribs 7b formed in the flat regions 3b. When the thicknesses of the concave ribs 7a and 7b are different in such a manner, the entire thickness has to be thicker to prevent pinholes in the thinnest area, leading to increase in weight of the resin laminate.

The present invention has been made in view of such circumstances and provides a resin laminate that is capable of equalizing the depth of concave ribs provided in a back side sheet even when there are flat regions and a convex region in a front side sheet of the resin laminate.

Solution to Problem

According to the present invention, a resin laminate is provided that includes: a front side sheet; and a back side sheet, both stacked across a hollow, the back side sheet being recessed into the hollow to provide a large number of concave ribs and a bottom of the large number of concave ribs welded to the front side sheet to couple the front side sheet to the back side sheet by the large number of concave ribs, wherein the front side sheet is provided with a front side flat region configured with a flat surface and a front side convex region projecting to an opposite side of the hollow, the back side sheet is provided with a back side flat region configured with a flat surface and a back side concave region recessed into the hollow, the front side convex region and the back side concave region are provided in a position facing each other, and at least one of the concave ribs is provided for each of the front side convex region and the front side flat region.

The present inventors have made various investigations to achieve the above object. As a result, they have come up with an idea of providing a concave region in a back side sheet so as to face a convex region of a front side sheet. Then, by providing a concave region in this position, it is possible to reduce a difference between the depth of the concave ribs in the convex region of the front side sheet and the depth of the concave ribs in the flat regions of the front side sheet, and thus they have come to complete the present invention. In addition, by equalizing the depth of the concave ribs, the thickness of the concave ribs is equalized. Then, by equalizing the thickness of the concave ribs, pinholes do not easily occur even when the back side sheet is thinned, thereby enabling reduction in thickness, that is, reduction in weight of the back side sheet.

Various embodiments of the present invention are exemplified below. The embodiments shown below may be combined with each other.

It is preferred that the front side convex region has a length in a height direction substantially equal to a length in a depth direction of the back side concave region.

It is preferred that the front side convex region has a shape fitting into the back side concave region.

It is preferred that the large number of concave ribs are arranged to substantially form an equilateral triangle with a line connecting centers of adjacent three of the concave ribs.

It is preferred that the adjacent three of the concave ribs at a border between the back side concave region and the back side flat region include the concave ribs provided in the back side concave region and the concave ribs provided in the back side flat region.

It is preferred that a border line between the back side concave region and the back side flat region is provided between the concave ribs provided in the back side concave region and the concave ribs provided in the back side flat region.

BRIEF DESCRIPTION OF DRAWINGS

FIG. 1 illustrate a configuration of a resin laminate 1 in a first embodiment of the present invention, where (a) is a plan view taken from a front side sheet 3 side, (c) is a bottom view taken from a back side sheet 5 side, and (b) is an A-A cross-sectional view of (c).

DESCRIPTION OF EMBODIMENTS

Figure 2:
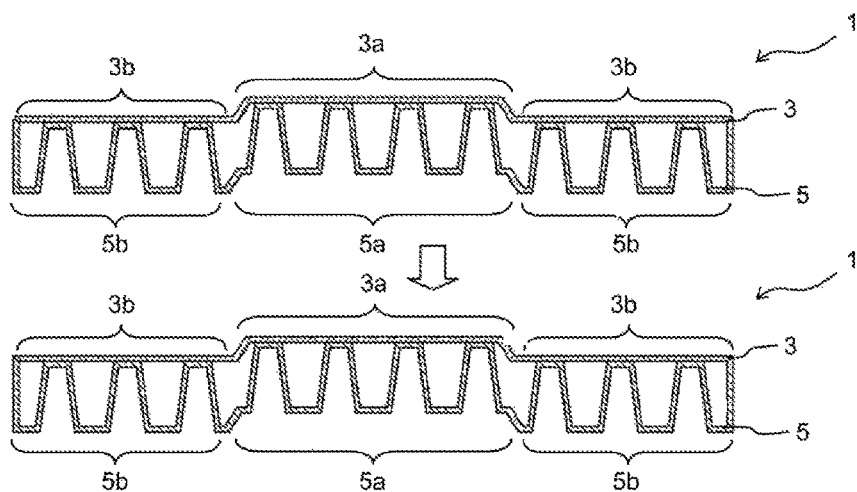
FIGS. 2(a) and (b) are cross-sectional views corresponding to FIG. 1(b), where (a) illustrates a state of vertically arranging two resin laminates 1 in FIG. 1 in alignment and (b) illustrates a state of stacking two resin laminates 1.
Figure 2:
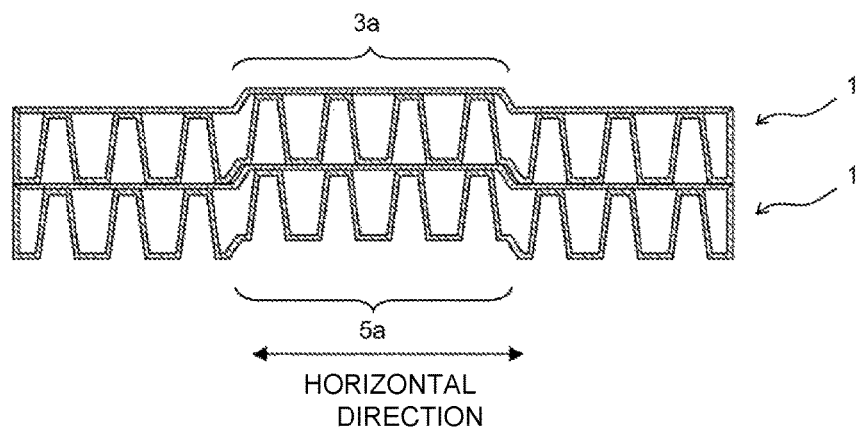

With reference to the drawings, embodiments of the present invention are described below.

1. First Embodiment

As illustrated in FIG. 1, a resin laminate 1 in the first embodiment of the present invention is provided with a front side sheet 3 and a back side sheet 5 that are stacked across a hollow 2. In the back side sheet 5, a large number of concave ribs 7a and 7b are formed by causing the back side sheet 5 recessed into the hollow 2. The bottom of the respective concave ribs 7a and 7b is welded to the front side sheet 3, thereby coupling the front side sheet 3 to the back side sheet 5 by the large number of concave ribs 7a and 7b. The front side sheet 3 is provided with front side flat regions 3b configured with a flat surface and a front side convex region 3a projecting to the opposite side of the hollow 2. The back side sheet 5 is provided with back side flat regions 5b configured with a flat surface and a back side concave region 5a recessed into the hollow 2. The front side convex region 3a and the back side concave region 5a are provided in a position facing each other. The large number of concave ribs 7a are formed in the front side convex region 3a, and the large number of concave ribs 7b are formed in the front side flat regions 3b.

Figure 6:
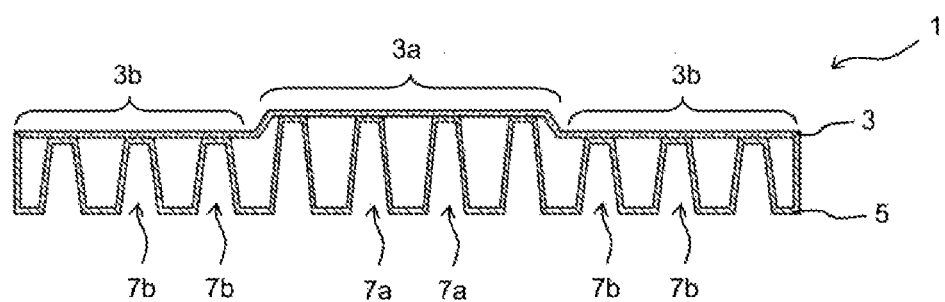
FIG. 6 is a reference drawing to illustrate the problems for the present invention and is a cross-sectional view corresponding to FIG. 1(b).

As described above, in a mode where the back side concave region 5a is not formed in the back side sheet 5 as illustrated in FIG. 6, there used to be a problem that the concave ribs 7a provided in the front side convex region 3a have a depth deeper than the depth of the concave ribs 7b provided in the front side flat regions 3b and the thickness becomes thinner accordingly. In the present embodiment, the back side concave region 5a is provided to face the front side convex region 3a, and thus deepening of the concave ribs in the front side convex region 3a may be suppressed. In the embodiment illustrated in FIG. 1, the front side convex region 3a has a length in the height direction substantially equal to the length in the depth direction of the back side concave region 5a, and thus the concave ribs 7a have a depth substantially identical to the depth of the concave ribs 7b. The length in the height direction of the front side convex region 3a, however, does not have to match the length in the depth direction of the back side concave region 5a, and there may be a difference in the lengths. In this case, the depth of the concave ribs 7a and the depth of the concave ribs 7b do not become completely same but the difference in the depth is less than that in the mode illustrated in FIG. 6. The effect of the present invention to equalize the depth of the concave ribs is thus obtained.

In the embodiment illustrated in FIG. 1, the front side convex region 3a has a shape fitting into the back side concave region 5a. As illustrated in FIGS. 2(a) and 2(b), when a plurality of resin laminates 1 are stacked, such shape allows volume reduction by having the front side convex region 3a entering the back side concave region 5a. In the state of the front side convex region 3a entering the back side concave region 5a, the plurality of stacked resin laminates 1 are suppressed from horizontal movement to each other, which may cause flaws on the surface of the resin laminates 1.

Then, with reference to FIG. 1(c), distribution of the concave ribs 7a and 7b viewed from the back side sheet 5 side is described. The concave ribs 7a and 7b are arranged to substantially form an equilateral triangle with a line connecting centers of adjacent three of the concave ribs. Specifically, as illustrated in FIG. 1(c), the back side concave region 5a is provided with the large number of concave ribs 7a, and the concave ribs 7a are arranged to form an equilateral triangle Ta with a line connecting the centers of adjacent three of the concave ribs 7a. The back side flat regions 5b are provided with the large number of concave ribs 7b, and the concave ribs 7b are arranged to form an equilateral triangle Tb with a line connecting the centers of adjacent three of the concave ribs 7b.

Further, at a border BB between the back side concave region 5a and the back side flat regions 5b, the concave ribs 7a and 7b are arranged to form an equilateral triangle Tab with a line connecting the centers of adjacent three of the concave ribs including 7a and 7b. In such a manner, the large number of concave ribs are uniformly arranged at an identical pitch over the back side concave region 5a and the back side flat regions 5b. The border BB between the back side concave region 5a and the back side flat regions 5b is provided in zigzag to weave between the concave ribs 7a and 7b. By providing the border BB in such a manner, the border BB may avoid overlap with the concave ribs, and thus mold design is facilitated. Meanwhile, there is no concave rib in the front surface side. A border FB between the front side convex region 3a and the front side flat regions 3b may thus be freely designed. It may be, as illustrated in FIG. 1(a) for example, linear. One of the points of the present invention is to avoid complex mold design by differentiating the shapes of the borders BB and FB in such a manner.

Figure 3:
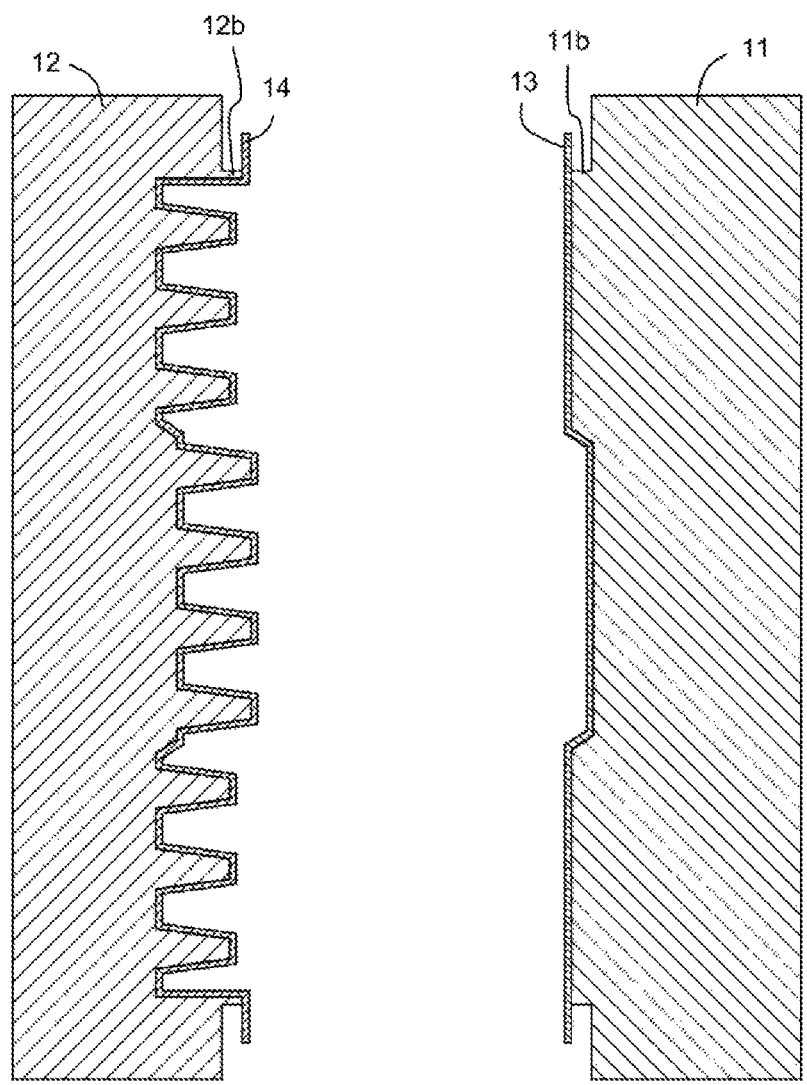
FIG. 3 illustrates a step of closely adhering melted resin sheets 13 and 14 to molds 11 and 12 in a procedure of manufacturing the resin laminate 1 in FIG. 1.

Then, a method of manufacturing the resin laminate 1 in the present embodiment is described. To manufacture the resin laminate 1 in the present embodiment, as illustrated in FIG. 3, a pair of molds 11 and 12 in accordance with the shape of the resin laminate 1 are prepared. By sucking the melted resin sheets (parisons) 13 and 14 from the mold 11 and 12 sides, the melted resin sheets 13 and 14 are closely adhered to the molds 11 and 12.

Figure 4:
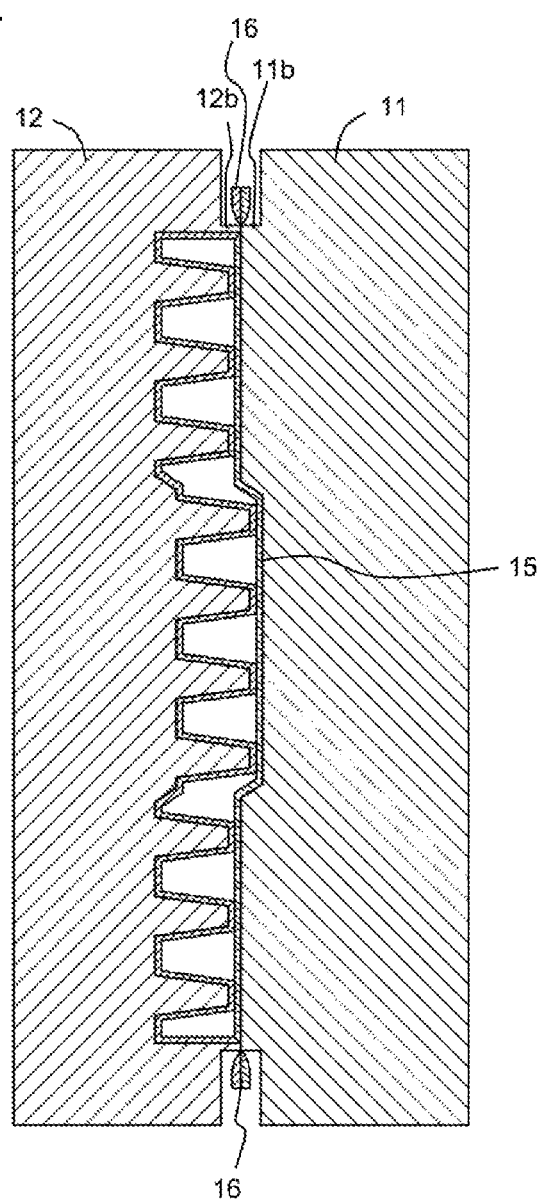
FIG. 4 is a diagram illustrating the procedure of manufacturing the resin laminate 1 following FIG. 3 and illustrates a state after closing the molds.

Then, as illustrated in FIG. 4, the molds 11 and 12 are closed to sandwich the melted resin sheets 13 and 14. The molds 11 and 12 are provided with pinch-offs 11b and 12b to surround a cavity 15 formed inside the molds 11 and 12. The melted resin sheets 13 and 14 are pinched and crushed by the pinch-offs 11b and 12b. In the melted resin sheets 13 and 14, the areas outside the cavity 15 become burrs 16 and the areas pinched by the pinch-offs 11b and 12b become cut-off lines for the burrs 16. After mold closing, air may be optionally blown in the cavity 15.

Then, the molds 11 and 12 are opened to remove the molded product and the burrs 16 are cut on the cut-off lines formed in the molded product by the pinch-offs 11b and 12b and eliminated.

By the above steps, the resin laminate 1 illustrated in FIG. 1 is formed.

2. Second Embodiment

Figure 5:
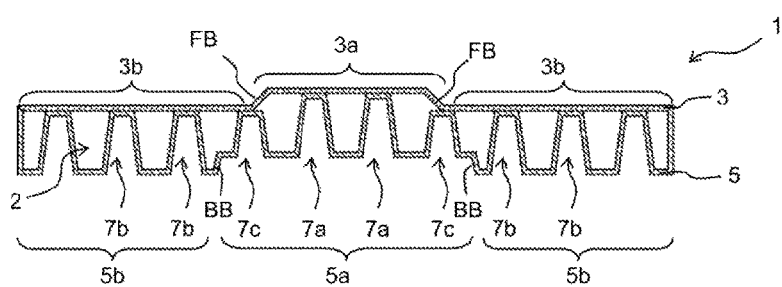
FIG. 5(a) is a cross-sectional view of a resin laminate 1 in a second embodiment of the present invention corresponding to FIGS. 1(b), and 5(b) illustrates a state of vertically stacking two resin laminates 1 in 5(a).
Figure 5:
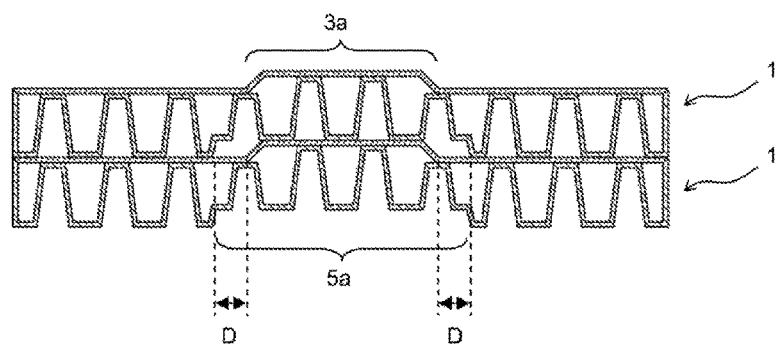

Then, with reference to FIG. 5, the second embodiment of the present invention is described. The resin laminate 1 in the present embodiment is similar to that in the first embodiment, and the configuration of the front side convex region 3a and the back side concave region 5a is mainly different. The following description is given mainly to such points.

In the first embodiment, the front side convex region 3a has a size substantially identical to that of the back side concave region 5a. As illustrated in FIG. 2(b), in a state of inserting the front side convex region 3a into the back side concave region 5a, the plurality of stacked resin laminates 1 is almost unmovable horizontally. Meanwhile, in the present embodiment, the back side concave region 5a is larger than the front side convex region 3a. The plurality of stacked resin laminates 1 is thus relatively movable horizontally within the range illustrated with arrows D in FIG. 5(b) even in the state of inserting the front side convex region 3a into the back side concave region 5a. The resin laminate 1 in the present embodiment is allowed to relatively move slightly in the horizontal direction when stacked, and thus the effect of suppressing flaws in the resin laminate 1 may be worse than that in the first embodiment. Instead, the front side convex region 3a is easily inserted into the back side concave region 5a and there is an advantage of easy stacking of a plurality of resin laminates 1.

In the first embodiment, the front side convex region 3a and the back side concave region 5a occupy a substantially same region, and thus there are the concave ribs 7a provided in the front side convex region 3a and the concave ribs 7b provided in the front side flat regions 3b. In the present embodiment, the back side concave region 5a is wider than the front side convex region 3a, and thus in addition to the concave ribs 7a and 7b, concave ribs 7c shallower than the concave ribs 7a are provided in the regions where the back side concave region 5a overlaps with the front side flat regions 3b.

In the first embodiment, as illustrated in FIG. 1(b), the borders FB and BB have a substantially identical angle of inclination. In the present embodiment, the border FB has an angle of inclination less than that of the border BB. The borders FB and BB may thus have different angles of inclination. Although the borders FB and BB are inclined surfaces in the first and second embodiments, these borders may be surfaces substantially vertical to the front surface or the back surface of the resin laminate 1.

REFERENCE SIGNS LIST

1: Resin Laminate, 2: Hollow, 3: Front Side Sheet, 5: Back Side Sheet, 11, 12: Mold, 13, 14: Melted Resin Sheet

The invention claimed is:

1. A resin laminate, comprising:
   a front side sheet and a back side sheet, both stacked across a hollow,
   the back side sheet being recessed into the hollows to provide a large number of concave ribs and a bottom of the large number of concave ribs welded to the front side sheet to couple the front side sheet to the back side sheet by the large number of concave ribs, wherein the front side sheet is provided with a front side flat region configured with a flat surface and a front side convex region projecting to an opposite side of the hollow,
   the back side sheet is provided with a back side flat region configured with a flat surface and a back side concave region recessed into the hollow,
   the front side convex region and the back side concave region are provided in a position facing each other,
   at least one of the concave ribs is provided for each of the front side convex region and the front side flat region,
   a border between the back side concave region and the back side flat region and a border between the front side convex region and the front side flat region are different from each other in shape, and
   the border between the back side concave region and the back side flat region is provided to weave between the concave ribs.

2. The resin laminate according to claim 1, wherein the front side convex region has a length in a height direction substantially equal to a length in a depth direction of the back side concave region.

3. The resin laminate according to claim 1, wherein the front side convex region has a shape fitting into the back side concave region.

4. The resin laminate according to any one of claim 1, wherein the large number of concave ribs are arranged to substantially form an equilateral triangle with a line connecting centers of adjacent three of the concave ribs.

5. The resin laminate according to claim 4, wherein the adjacent three of the concave ribs at a border between the back side concave region and the back side flat region comprise the concave ribs provided in the back side concave region and the concave ribs provided in the back side flat region.

6. The resin laminate according to any one of claim 1, wherein a border line between the back side concave region and the back side flat region is provided between the concave ribs provided in the back side concave region and the concave ribs provided in the back side flat region.

* * * * *